(12) United States Patent
Aleksic et al.

(10) Patent No.: US 11,996,085 B2
(45) Date of Patent: *May 28, 2024

(54) ENHANCED SPEECH ENDPOINTING

(71) Applicant: Google LLC, Mountain View, CA (US)

(72) Inventors: Petar Aleksic, Jersey City, NJ (US);
Glen Shires, Danville, CA (US);
Michael Buchanan, London (GB)

(73) Assignee: Google LLC, Mountain View, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/115,403

(22) Filed: Dec. 8, 2020

(65) Prior Publication Data

US 2021/0090554 A1 Mar. 25, 2021

Related U.S. Application Data

(63) Continuation of application No. 15/711,260, filed on Sep. 21, 2017, now Pat. No. 10,885,898, which is a
(Continued)

(51) Int. Cl.
*G10L 15/04* (2013.01)
*G06F 3/16* (2006.01)
(Continued)

(52) U.S. Cl.
CPC .............. *G10L 15/05* (2013.01); *G06F 3/167* (2013.01); *G10L 15/04* (2013.01);
(Continued)

(58) Field of Classification Search
None
See application file for complete search history.

(56) References Cited

U.S. PATENT DOCUMENTS 7,277,853 B1 10/2007 Bou-Ghazale et al.
7,991,614 B2 8/2011 Washio et al.
(Continued)

FOREIGN PATENT DOCUMENTS

JP H06259090 A 9/1994
JP 2000089791 A 3/2000
(Continued)

OTHER PUBLICATIONS

Japanese Office Action, Japanese Application No. 2019-139836, dated Jan. 4, 2021, 9 pages.
(Continued)

*Primary Examiner* — Richa Sonifrank
(74) *Attorney, Agent, or Firm* — Honigman LLP; Brett A. Krueger; Grant Griffith (57) ABSTRACT

Methods, systems, and apparatus, including computer programs encoded on a computer storage medium, for receiving audio data including an utterance, obtaining context data that indicates one or more expected speech recognition results, determining an expected speech recognition result based on the context data, receiving an intermediate speech recognition result generated by a speech recognition engine, comparing the intermediate speech recognition result to the expected speech recognition result for the audio data based on the context data, determining whether the intermediate speech recognition result corresponds to the expected speech recognition result for the audio data based on the context data, and setting an end of speech condition and providing a final speech recognition result in response to determining the intermediate speech recognition result matches the expected speech recognition result, the final speech recognition result including the one or more expected speech recognition results indicated by the context data.

16 Claims, 3 Drawing Sheets

Related U.S. Application Data continuation of application No. 15/192,431, filed on Jun. 24, 2016, now abandoned, which is a continuation of application No. 14/844,563, filed on Sep. 3, 2015, now Pat. No. 10,339,917.

(51) Int. Cl.
| | |
|---|---|
| G10L 15/05 | (2013.01) |
| G10L 15/08 | (2006.01) |
| G10L 15/18 | (2013.01) |
| G10L 15/22 | (2006.01) |
| G10L 15/26 | (2006.01) |
| G10L 25/78 | (2013.01) |

(52) U.S. Cl.
CPC .......... *G10L 15/1815* (2013.01); *G10L 15/22* (2013.01); *G10L 15/26* (2013.01); *G10L 25/78* (2013.01); *G10L 2015/088* (2013.01); *G10L 2025/783* (2013.01)

(56) References Cited

U.S. PATENT DOCUMENTS

| | | | |
|---|---|---|---|
| 8,000,966 | B2 | 8/2011 | Mori et al. |
| 8,775,191 | B1 | 8/2014 | Sharifi et al. |
| 9,009,054 | B2 | 4/2015 | Liu et al. |
| 9,437,186 | B1* | 9/2016 | Liu ................. G10L 15/22 |
| 2007/0016426 | A1 | 1/2007 | Hershey et al. |
| 2011/0106531 | A1 | 5/2011 | Liu et al. |
| 2012/0078397 | A1* | 3/2012 | Lee ................. H04M 1/72433 700/94 |
| 2012/0265528 | A1 | 10/2012 | Gruber et al. |
| 2013/0297307 | A1 | 11/2013 | Paek et al. |
| 2015/0310879 | A1 | 10/2015 | Buchanan et al. |
| 2015/0348538 | A1 | 12/2015 | Donaldson |
| 2016/0125883 | A1* | 5/2016 | Koya ................. G10L 15/22 704/232 |
| 2016/0358598 | A1* | 12/2016 | Williams ................. G10L 17/02 |
| 2017/0068423 | A1* | 3/2017 | Napolitano ................. G06F 16/489 |

FOREIGN PATENT DOCUMENTS

| | | |
|---|---|---|
| JP | 2003216179 A | 7/2003 |
| JP | 200517932 A | 1/2005 |
| JP | 2005017932 A | 1/2005 |
| JP | 2005283972 A | 10/2005 |
| JP | 2010072098 A1 | 4/2010 |
| JP | 2010217628 | 9/2010 |
| JP | 2010254475 A | 11/2010 |
| JP | 2012226068 A | 11/2012 |
| WO | 2010013369 A1 | 2/2010 |
| WO | 2011151502 A1 | 12/2011 |
| WO | 2013053798 A1 | 4/2013 |
| WO | WO2016157650 A1 | 1/2018 |

OTHER PUBLICATIONS

India Office Action, Application No. 201847004247, dated Oct. 9, 2020, 6 pages.
Hotta et al., Voice interaction system that repairs, after the fact, problems arising from incorrect division of user utterances, Information Processing Society of Japan (IPSJ) SIG Technical Report: Voice/Language Information Processing, IPSJ, May 16, 2013, 2013-SLP-96, pp. 1-8.
JP Office Action issued in Japanese Application No. 2019-139836, dated Oct. 5, 2020, 6 pages.
EP Communication Pursuant to Article 94(3) EPC in European Appln. No. 18199934, dated Oct. 8, 2019, 4 pages.
EP Extended European Search Report issued in European Application No. 18199934.3, dated Feb. 11, 2019, 7 pages.
JP Office Action issued in Japanese Application No. 2017-526108, dated Aug. 6, 2018, 12 pages (with English Translation).
KR Office Action issued in Korean Application No. 10-2017-7013369, dated Jul. 25, 2018, 11 pages (with English Translation).
JP Office Action issued in Japanese Application No. 2017-526108, dated Jan. 21, 2019, 6 pages (with English translation).
International Preliminary Report on Patentability issued in International Application No. PCT/US2016047961, dated Mar. 15, 2018, 8 pages.
International Search Report and Written Opinion in International Application No. PCT US2016/047961, dated Nov. 23, 2016, 11 pages.

* cited by examiner

ENHANCED SPEECH ENDPOINTING

CROSS-REFERENCE TO RELATED APPLICATIONS

This U.S. patent application is a continuation of, and claims priority under 35 U.S.C. § 120 from, U.S. patent application Ser. No. 15/711,260, filed on Sep. 21, 2017, which is a continuation of U.S. patent application Ser. No. 15/192,431, filed on Jun. 24, 2016, which is a continuation of U.S. patent application Ser. No. 14/844,563, filed on Sep. 3, 2015. The disclosures of these prior applications are considered part of the disclosure of this application and are hereby incorporated by reference in their entireties.

FIELD

The present specification generally relates to speech recognition.

BACKGROUND

Natural language processing systems typically use endpointers to determine when a user has started and finished speaking an utterance. Some traditional endpointers evaluate the duration of pauses between words in determining when an utterance begins or ends. For instance, if a user says "what is <long pause> for dinner," a traditional endpointer may segment the voice input at the long pause, and may instruct the natural language processing system to attempt to process the incomplete phrase "what is," instead of the complete phrase "what is for dinner." If an endpointer designates an incorrect beginning or ending point for a voice input, the result of processing the voice input using the natural language processing system may be inaccurate or undesirable.

SUMMARY

An innovative aspect of the subject matter described in this specification is using provided context data to improve speech endpointing, achieving decreased speech recognition latency and improved speech recognition accuracy. Client provided context data may be used to determine expected speech recognition results of particular audio data representing an utterance. Intermediate speech recognition results may be returned by a speech recognizer. As the intermediate speech recognition results are returned, the intermediate speech recognition results may be compared to the context data that indicates expected speech recognition results.

If a match or sufficient similarity is determined between an intermediate speech recognition result and context data, a speech endpointer may endpoint the utterance corresponding to the audio data and return the final speech recognition result. If a match is not determined between an intermediate speech recognition result and context data or a partial match is determined between an intermediate speech recognition result and context data, the speech endpointer may dynamically determine an end-of-speech (EOS) timeout, e.g., to allow for additional audio data to be input.

One innovative aspect of the subject matter described in this specification is embodied in methods that may include the actions of receiving audio data including an utterance, obtaining context data that indicates one or more expected speech recognition results, and determining an expected speech recognition result for the audio data based on the context data. The methods may include the actions of receiving an intermediate speech recognition result generated by a speech recognition engine, comparing the intermediate speech recognition result to the expected speech recognition result for the audio data based on the context data, and determining whether the intermediate speech recognition result corresponds to the expected speech recognition result for the audio data based on the context data. The methods may include the actions of setting an end of speech condition and providing a final speech recognition result in response to determining the intermediate speech recognition result matches or is sufficiently similar to the expected speech recognition result for the audio data based on the context data, the final speech recognition result including the one or more expected speech recognition results indicated by the context data.

In general, another aspect of the subject matter described in this specification may be embodied in methods that include the actions of determining a time period for the end of speech condition to receive additional audio data in response to determining the intermediate speech recognition result includes a partial match or no match to the expected speech recognition result for the audio data based on the context data. Another aspect of the subject matter described in this specification may be embodied in methods that include the actions of setting the end of speech condition in response to the time period satisfying a threshold time.

Another aspect of the subject matter described in this specification may be embodied in methods that include the actions of determining a time period for the end of speech condition to receive additional audio data in response to determining the intermediate speech recognition result includes a partial match or no match to the expected speech recognition result for the audio data based on the context data, where the time period for the end of speech condition is determined to be a first amount of time in response to determining the intermediate speech recognition result includes a partial match to the expected speech recognition result for the audio data based on the context data, and the time period is determined to be a second amount of time in response to determining the intermediate speech recognition result includes no match to the expected speech recognition result for the audio data based on the context data, the first amount of time being different than the second amount of time.

These and other embodiments may each optionally include one or more of the following features. For instance, obtaining context data may include obtaining and storing context data in a memory prior to receiving the audio data comprising the utterance. Further, obtaining context data may include obtaining context data contemporaneously with receiving the audio data comprising the utterance. Moreover, the context data may be obtained from a client device and correspond to data stored in or displayed on the client device. In addition, the end of speech condition may include turning off an audio input device into which the utterance was made.

Other embodiments of these aspects include corresponding systems, apparatus, and computer programs, configured to perform the actions of the methods, encoded on computer storage devices. For instance, a system comprising one or more computers and one or more storage devices storing instructions that are operable, when executed by the one or more computers, to cause the one or more computers to perform operations comprising The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
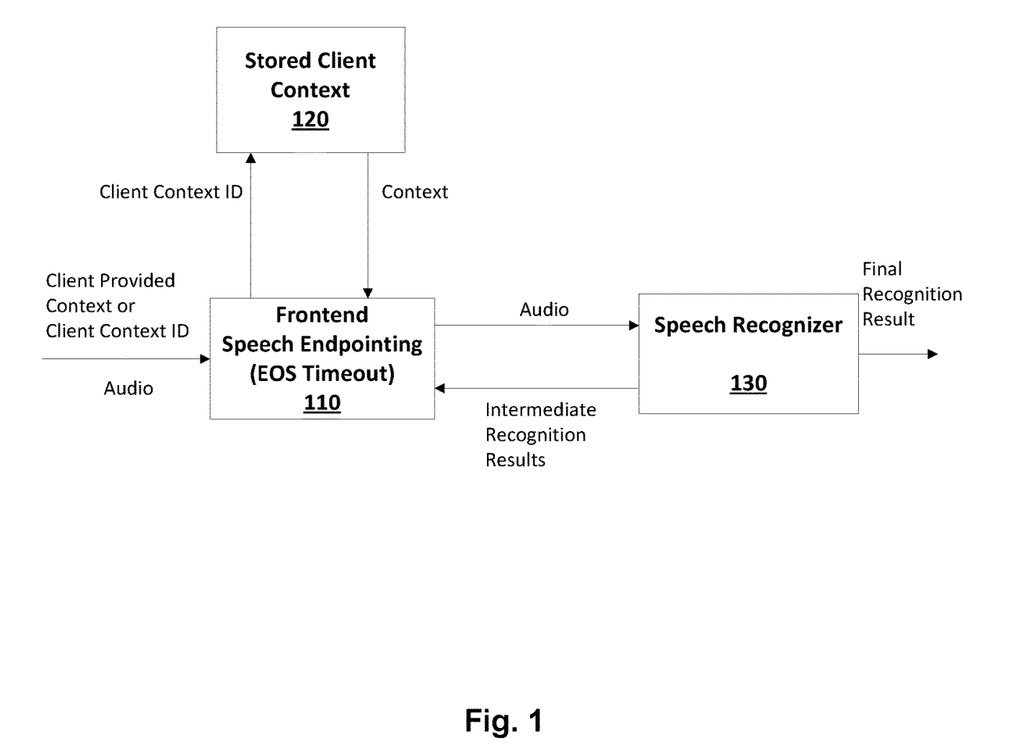
FIG. 1 is a diagram of an example system according to embodiments of the invention.

FIG. 1 is a diagram of an example system according to embodiments of the invention. System 100 includes a speech endpointer 110, a storage medium 120, and a speech recognizer 130. The diagram shows various inputs and outputs, which may or may not be illustrated in particular sequence.

Generally, in speech recognition systems, speech endpointing is the process of determining which part of the incoming audio contains speech by determining the beginning and end of an utterance. The part of incoming audio corresponding to speech is sent to the speech recognizer to obtain a speech recognition result or transcript of the audio.

Inaccurate speech endpointing can lead to a significant increase in recognition errors and negatively affect user experience. The effects of inaccurate speech endpointing can be even more detrimental in noisy conditions, where the problem of endpointing becomes much more difficult. User perceived latency of speech recognition is the time from when the user stops speaking until the speech recognition result or transcript is received. Inaccurate speech endpointing may lead to an increase in user perceived latency of speech recognition. Thus, advantages of the present disclosure include improving speech recognition latency and improving speech recognition accuracy.

In order to improve speech endpointing, described herein are various ways to utilize context, which may be provided by a client device before, after, or at the time of, a speech recognition request, thereby improving speech recognition accuracy and decreasing speech recognition latency.

During speech recognition, as the recognition system receives speech audio data intermediate speech recognition results may be sent back to the speech endpointing module and client as soon as they are available. In speech endpointing, user perceived latency is highly correlated to end-of-speech (EOS) timeout, which represents the time that the system will wait, after it appears the user has stopped speaking, for the user to continue to speak. The system waits because there is uncertainty as to whether the user has finished speaking or is only taking a short pause. If the user does not continue to speak, i.e., further speech is not detected, after a predetermined EOS timeout, the final recognition result may be returned and the current recognition session may be terminated, e.g., the microphone may be closed or turned off. If the user continues to speak before the EOS timeout expires, the system may continue to consume audio and perform speech recognition on that audio. Thus, the choice of EOS timeout can significantly affect both accuracy and latency of the speech recognition result.

To dynamically adjust the EOS timeout, client provided context may be used, as described herein, resulting in reduced speech recognition latency and improved accuracy of the speech recognition result.

Referring to FIG. 1, audio data corresponding to an utterance may be received from a client device and input into speech endpointer 110. Contemporaneously, i.e., before, during, and/or after receiving the audio data, context data may be received from the client device and input into speech endpointer 110. In alternative embodiments, the context data may be received in advance of receiving the audio data, and may be associated with a predetermined client context ID. The received context data and associated client context ID may be stored in storage medium 120 as stored client context. Thus, the context data and context ID may be stored in association with each other prior to the audio data being received, and context ID may be received contemporaneously with receiving the audio data. The context data associated with the received context ID may be retrieved from storage medium 120.

The received audio data may be input into speech recognizer 130. Speech recognizer 130 may process the audio data and, as it is processing, return intermediate speech recognition results for the audio data. The speech endpointing module may compare the intermediate speech recognition results of the audio data returned from speech recognizer 130 to the context data that was either received contemporaneously with receiving the audio data or retrieved from storage medium 120 based on a context ID received contemporaneously with receiving the audio data. As audio data is inputted to speech recognizer 130, it continues to process the audio data and return recognition results of the audio data.

If a match or sufficient similarity is determined between an intermediate speech recognition result and context data, speech endpointer 110 may endpoint the utterance corresponding to the audio data and return the final speech recognition result. The returned speech recognition result may be transmitted to the client device. The final speech recognition result may include context data. For example, the context data may include one or more names and the final recognition result may include one or more of the names included in the context data.

If a match is not determined between an intermediate speech recognition result and context data or a partial match is determined between an intermediate speech recognition result and context data, speech endpointer 110 may dynamically adjust EOS timeout. For example, EOS timeout may be extended by a predetermined amount of time in association with an expected speech recognition result. EOS timeout may be extended by a predetermined amount of time in response to determining a partial match between an intermediate speech recognition result and context data. Further, EOS timeout may be extended by a predetermined amount of time in response to determining no match between an intermediate speech recognition result and context data. Alternatively, in response to determining no match between an intermediate speech recognition result and context data, EOS timeout may revert to a default period of time.

The context data may be associated with a query presented to the user. Alternatively, the context data may be derived from information displayed on a screen, such as text, images, video, audio, or the like. The context data may alternatively be based on a current operating state or condition of the client device. For example, the context data may be associated with a given operating state or condition of an application being executed on the client device. For example, the application may be in a state in which a selection is to be made or particular information is to be inputted. Thus, the context data may be derived or generated in a variety of ways, including based on expected utterances associated with a current state of the client device.

For example, options may be displayed, of which a user is to choose one of those options. The displayed options may be received as context data. When an utterance is received and the speech recognizer begins processing the audio data associated with the utterance, as soon as the speech recognizer determines a match, e.g., sufficient similarity, for one of those displayed options input as context data, an end of speech condition may be immediately initiated and the speech recognition result may be returned. Thus, rather than waiting for a full EOS timeout to expire for endpointing, latency of speech recognition may be reduced by returning the speech recognition result once a match is determined for the utterance based on the context data.

The endpointing may additionally be based on an expected utterance or response to a query. For example, with a list of contacts as context data associated with an input of recipients to which a message is to be transmitted, the endpointer may allow for input of more than one contact name. Thus, for example, the endpointer would not return the speech recognition result of only the first name input and stop the input of audio data in response to determining a match of that first name with the context data and the speech recognizer returning the first name input. For example, a query may be presented to the user, such as "Who do you want to send this message to?" and the user may respond "John, Bill, and Joe." In a case where "John" is part of the contact list as context data, the system would not end processing (i.e., endpoint the utterance) after determining that the input utterance of John matches the context data, but rather would allow for the processing of the full utterance of "John, Bill, and Joe." In such a case, an expected input may include more than one name, and based on the expected input, the system may extend EOS timeout to allow for an utterance of more than one name. Nevertheless, speech recognition latency may still be decreased based on the faster determination of a match to context data of intermediate speech recognition results returned from the speech recognizer.

If a partial match to context data is determined for an utterance, EOS timeout may be extended to allow for additional audio data to be input. For example, based on context data, a birth year is expected to be input, and the user says "19" followed by a pause. In this case, the speech recognizer may return the recognition result of "19" and the system may determine that it is a partial match to context data. In response to that determination, the EOS timeout may be extended for the user to speak the remaining portion of the year. However, if the user does not speak any additional input, the endpointer may initiate an end of speech condition based on a predetermined default EOS timeout.

A particular example is the client being an application that in a particular state may ask a user to choose one of three colors displayed on the screen as a prompt of, for example, "Please say red, green or blue." As the user begins speaking to respond to the prompt, the application may send, together with the audio data, the application or client context data, which in this case may be the phrases "red", "green", "blue". As described above, these phrases may be used by the speech endpointing system to decrease latency of the speech recognition result. The speech endpointing module, e.g., speech endpointer 110, may receive and save this context data. As intermediate, i.e., not final, recognition results begin to be received from speech recognizer 130, the intermediate speech recognition result may be compared to the context data provided. Once the recognition result returned by speech recognizer 130 is determined to match a phrase present in the client provided context data, the speech endpointer 110 does not need to wait any more for EOS timeout to expire. Instead the final recognition result may be returned and transmitted to the client, saving time and decreasing speech recognition latency.

Another particular example is the application being in a particular state or function in which flight scheduling is to be executed. The user may be prompted to say a particular query phrase, such as the phrase: "from [Origin_Airport] to [Destination_Airport]". The list of all airports may be received as context data at the speech endpointing module, e.g., speech endpointer 110. Alternatively, the context data including a list of all airports may be stored in association with a context ID in a storage medium 120 and the context ID may received, and the context data associated with that context ID retrieved from the storage medium 120.

In response to the user saying, for example, "From JFK to" and then pausing while trying to think of the destination airport name, the speech recognition system might terminate the recognition session if the pause made is longer than the default EOS timeout. This would result in only a partial recognition result being generated, an undesirable user experience because the user has to repeat the whole phrase to obtain a proper output. However, by using client provided information as context data, the audio is expected to correspond to a phrase "from [Origin_Airport] to [Destination_Airport]" and the EOS timeout may be extended if only a partial match to the expected phrase is received. Thus, in the scenario described above, in response to the speech endpointer module, e.g., speech endpointer 110, receiving only "From JFK" as an example of an intermediate result, the system waits for the user to finish saying the expected phrase for an extended amount of time beyond when a default EOS timeout may have expired, thereby extending the time for the user to speak the phrase. When the result in the form of the expected phrase "from [Origin_Airport] to [Destination_Airport]" is received, the speech endpointer 110 will terminate the recognition session. Alternatively, more complex grammars may be used to accommodate a variety of phrases users may utter to convey the information, such as "I'd like to go to [Destination_Airport], leaving from [Origin_Airport]."

In some implementations, the context data is stored in storage medium 120, which is particularly useful for scenarios in which the context is not likely to change. The example described above regarding airports is one example scenario, as the list of airports as context data may be received in advance since that list will not change very often. As another example, in the scenario of filling a form, in which, for example, a user needs to speak a birth date or year, the context data may also be received in advance and stored.

Figure 2:
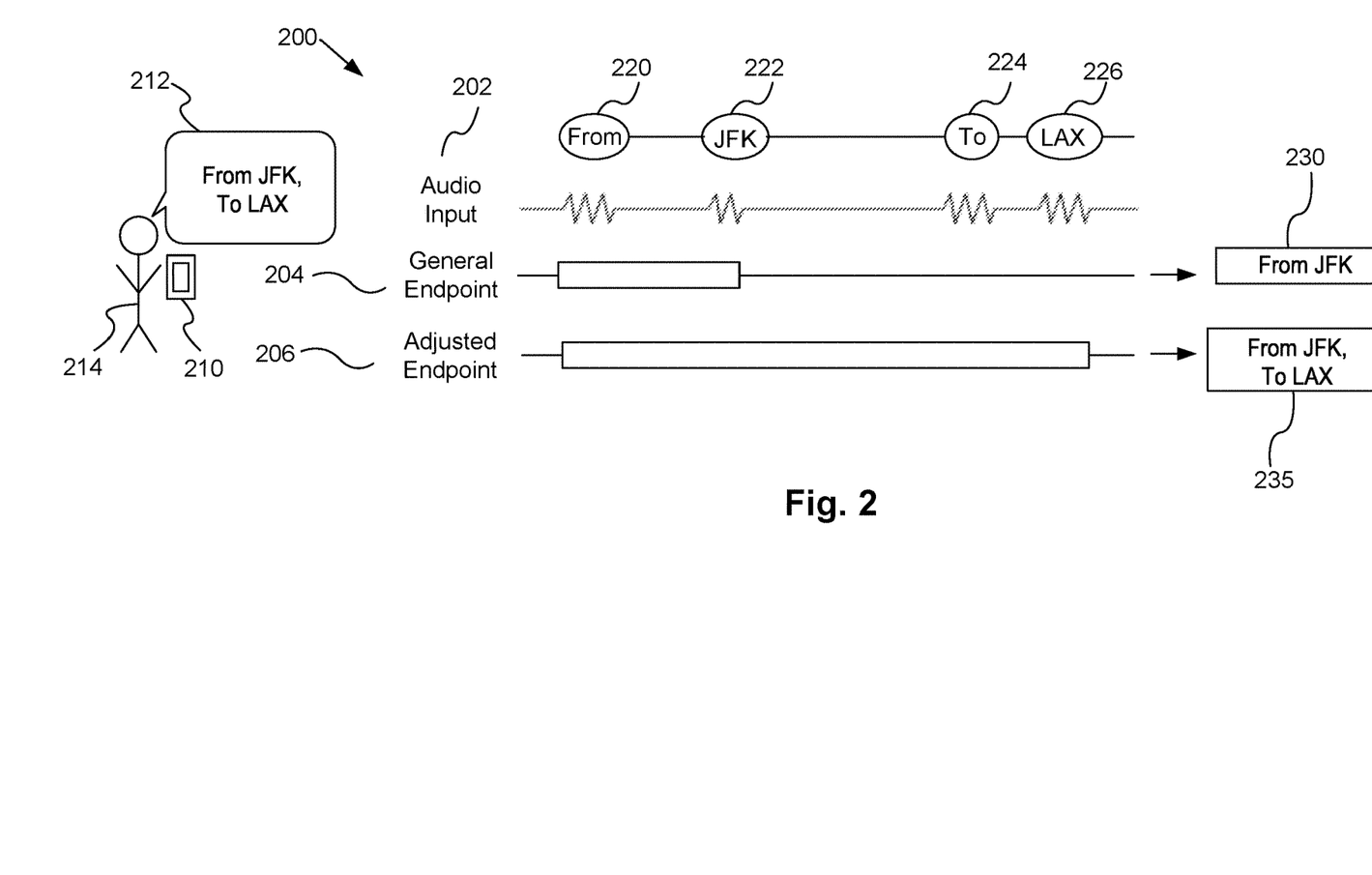
FIG. 2 is a diagram illustrating example utterances and example signals used in speech recognition and endpointing according to embodiments of the invention.

In general, as depicted in FIG. 2, diagram 200 illustrates signals 202-206 that may be generated or detected by computing device 210 when the computing device 210 is processing an incoming audio input 202. The computing device 210 may receive the audio input 202 through a microphone or other audio input device of the computing device 210. The computing device 210 receives the audio input 202 and may sample the audio input 202 at a predesignated frequency and resolution. For example, the computing device 210 may sample the audio input 202 at 8 kHz, 16 kHz, 44.1 kHz, or any other sample rate, and the resolution may be 16 bits, 22 bits, or any other resolution. Audio input 202 illustrates sampled analog data that is based on an example utterance 212 from user 214. The computing device 210 may record and store the audio input 202 corresponding to the utterance 212.

The computing device 210 may transcribe the utterance 212 spoken by the user 214. Alternatively, a transcription of the utterance 212 may be generated on a remote server. In some implementations, the computing device 210 transcribes the words of the utterance 212 using a processor of the computing device 210 that is running automated speech recognition (ASR) software. For example, the computing device 210 may determine locally on the computing device 210 that an initial portion audio input 202 contains the term 220 "from." The ASR software may receive the audio input 202 as the computing device 210 receives the utterance 212 from the user. As the ASR software recognizes a term in the audio input 202, then the ASR software provides that term for output to the computing device 210. The computing device 210 may record the amount of time between the ASR software returning terms that the ASR software recognizes.

In some implementations, a server accessible through a network may be running the ASR software. In this case, the computing device may transmit the audio input 202 to the server over the network, receive terms from the server, and record an amount of time between the server returning terms. In addition, the speech endpointing module, e.g., speech endpointer 110, may also be on a server accessible through the network.

As illustrated in FIG. 2, in response to a prompt for a flight search, for example, a user may speak the utterance "From JFK" followed by a pause before finishing the phrase "To JFK". In that case, a default or general endpoint 204 may only capture the term 220 "From" and the term 222 "JFK". The default EOS timeout occurs during the pause between the phrases in the utterance 212 and an end of speech condition may be initiated as a result. Thus, only the term 220 "From" and the term 222 "JFK" may be transcribed for the utterance 212 made in response to the prompt, producing a final recognition result 230 of "From JFK". However, according to embodiments of the present disclosure, based on context data, it may be determined that a query having a departure airport and a destination airport is being inputted as the utterance 212 and the EOS timeout may be dynamically adjusted to extend the time for the user to finish speaking the query. In that case, an adjusted endpoint 206 may capture all of the terms 220-226 in the utterance 212, and thereby generate a transcription 235 of the query as "From JFK, To LAX".

Figure 3:
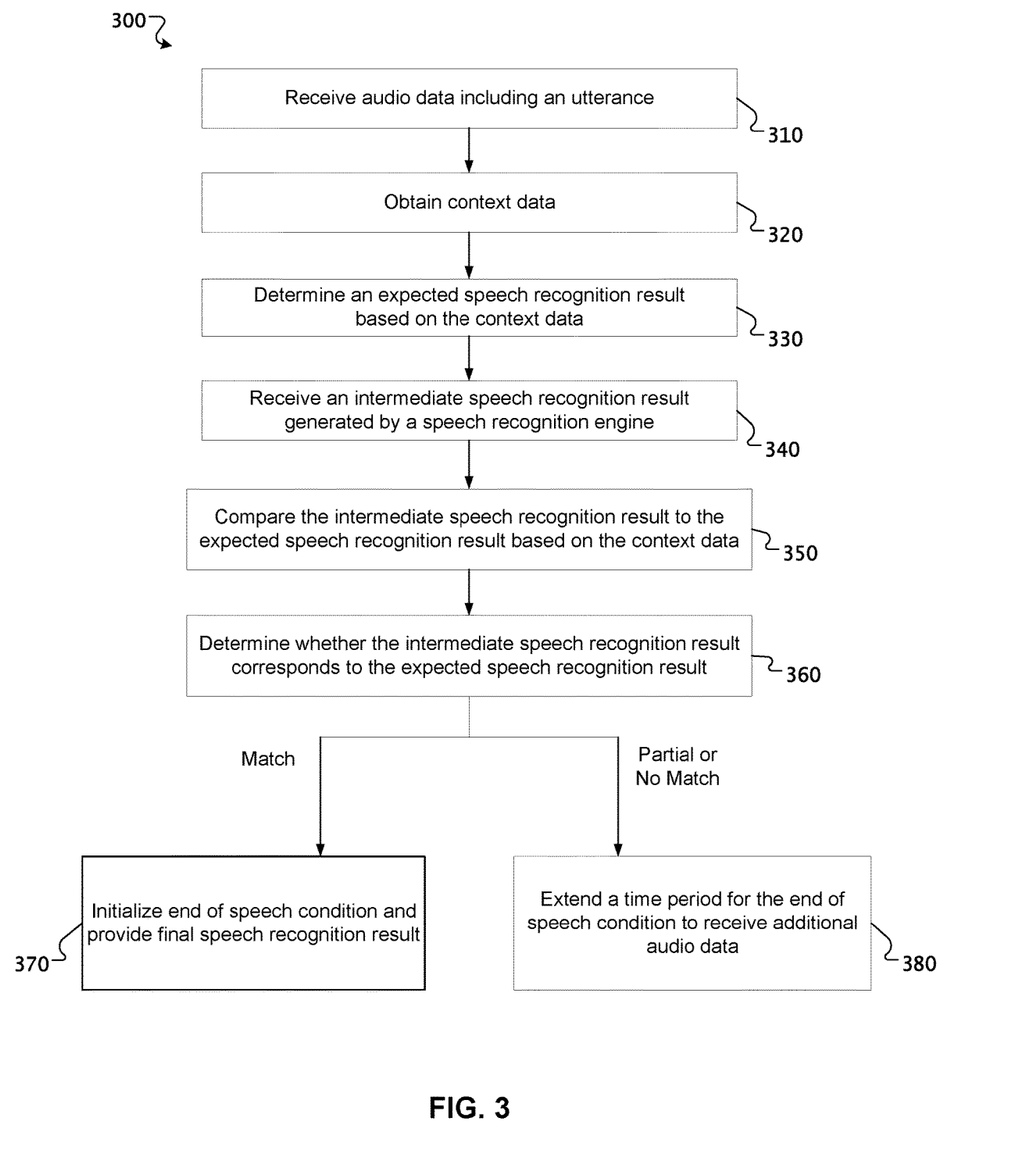
FIG. 3 is a flow chart illustrating an example process for endpointing according to embodiments of the invention.

FIG. 3 is a diagram of an example process for endpointing of an utterance. The process 300 may be performed by a computing device such as the computing device 210 from FIG. 2 or by a server or network of servers, such as depicted in FIG. 1. The process 300 analyzes audio data and context data to compare intermediate speech recognition results to expected speech recognition results for the audio data based on the context data and dynamically adjust an EOS timeout to endpoint the utterance in accordance with determining whether there is either a match or no match or a partial match between the intermediate speech recognition results and the expected speech recognition results.

The system receives audio data including an utterance (310). The utterance may be received from a user speaking into a microphone of a computing device and the device receiving an audio signal corresponding to the user speaking. The device may process the audio signal and may transmit it to a server. The audio data including an utterance may be received by the server. In some implementations, the audio data may not be transmitted to a server and the speech recognition may occur at the computing device, rather than the server.

The system obtains context data indicating one or more expected speech recognition results (320). As described above, the context data may be received contemporaneously with receiving the audio data. In alternative embodiments, the context data may be received in advance of receiving the audio data, and may be associated with a predetermined client context ID and stored in a storage device. In that case, the system may receive a client context ID contemporaneously with receiving the audio data and retrieve the context data associated with the client context ID from the storage device. The context data may be associated with a query presented to the user and, for example, the context data may include one or more expected speech recognition results associated with the query. Alternatively, the context data may be derived from information displayed on a screen, such as text, images, video, audio, or the like. The context data may alternatively be based on a current operating state or condition of the client device.

The system determines an expected speech recognition result for the audio data based on the context data (330). For example, if a user is prompted for a name with a query such as "Who do you want to call?" or "Who do you want to play the game with?", the context data may be a contact list associated with the user. Thus, an expected speech recognition result may be one or more of the names in the contact list associated with the user. As another example, if an entry field for a birth year is highlighted or selected, the context data may be a list of years and the expected speech recognition result may be one of those years.

The system receives an intermediate speech recognition result generated by a speech recognition engine (340). As the audio data is received and transmitted to a speech recognition engine, the speech recognition engine process the audio data and begins generating and returning intermediate speech recognition results. For example, an intermediate speech recognition result may include a first syllable of a word or the first phonetic sound of a word. Alternatively, an intermediate speech recognition result may include multiple syllables of a word, multiple phonetic sounds, or one or more words of a phrase.

The system compares the intermediate speech recognition result to the expected speech recognition result for the audio data based on the context data (350). As the speech recognition engine generates and returns an intermediate speech recognition result, that intermediate speech recognition result may be compared to expected speech recognition results determined based on the context data. Returning to the example described above in which the context data is a contact list, the expected speech recognition result may be one or more of the names in the contact list. The intermediate speech recognition result is compared to the expected speech recognition result of the one or more names in the contact list. For example, if the contact list contains the names "Bill", "Charlie", and "Hillary", the system compares the intermediate speech recognition result to each of those names.

The system determines whether the intermediate speech recognition result corresponds to the expected speech recognition result for the audio data based on the context data (360). Returning again to the example described above with context data indicating a contact list of the names "Bill", "Charlie", and "Hillary", if the intermediate speech recognition result is, for example, "Cha-", then based on the context data indicating that the expected speech recognition result is one of "Bill", "Charlie", and "Hillary", it can be determined that the intermediate speech recognition result corresponds to the expected speech recognition result of "Charlie" and not "Bill" or "Hillary". In addition, the intermediate speech recognition result may have a particular confidence level associated with the intermediate speech recognition result generated by the speech recognition engine. The confidence level may correspond to a confidence of the accuracy of the speech recognition result. The confidence level may contribute to determining whether the intermediate speech recognition result corresponds to the expected speech recognition result.

The system initializes an end of speech condition and provides a final speech recognition result in response to determining the intermediate speech recognition result matches the expected speech recognition result for the audio data based on the context data (370). The final speech recognition result may include the one or more expected speech recognition results indicated by the context data. Thus, as soon as it is determined that an intermediate speech recognition result matches an expected speech recognition result, the endpointer does not need to continue waiting for EOS timeout to expire. Rather, the final speech recognition result may be output to the client device or to the user, thereby decreasing speech recognition latency.

The system extends a time period for the end of speech condition to receive additional audio data in response to determining the intermediate speech recognition result includes a partial match or no match to the expected speech recognition result for the audio data based on the context data (380). The EOS timeout may be dynamically adjusted if a match is not determined between an intermediate speech recognition result and context data or a partial match is determined between an intermediate speech recognition result and context data. EOS timeout may be extended by a predetermined amount of time in association with a particular expected speech recognition result. For example, if an expected speech recognition result is one of several three word phrases and the intermediate speech recognition result contains only two words, then EOS timeout may be extended by a predetermined amount of time to allow additional time for the input of audio of the third word.

EOS timeout may be extended by a predetermined amount of time in response to determining a partial match between an intermediate speech recognition result and context data. For example, if the context data indicates an expected speech recognition result is a number between 101 and 200 and the utterance spoken by the user is "one hundred" followed by a pause, and then "twenty-five", the default EOS timeout may cause the speech recognition system to terminate the recognition session if the pause is longer than the timeout, and only generate a transcription of "one hundred", causing the user to have to repeat the whole phrase. However, in accordance with embodiments of the present disclosure, if the intermediate speech recognition result is "one hundred", then EOS timeout may be extended by a predetermined amount of time to allow additional time for the input of audio of the remainder of the number based on the context data indicating the expected speech recognition result is a number between 101 and 200. Thus, a transcription of the full utterance "one hundred twenty-five" may be generated, improving the accuracy of the speech recognition system and preventing a user from being forced to repeat the whole phrase.

Further, EOS timeout may be extended by a predetermined amount of time in response to determining no match between an intermediate speech recognition result and context data. For example, if a folder of files is being displayed and a prompt is presented such as "Which file would you like to open?", the context data may be a list of files in that open folder. Based on the context data, an expected intermediate speech recognition result may be one or more of the names of the files. If the utterance spoken by the user is "open" followed by a pause, and then "file A", and the intermediate speech recognition result is "open", the intermediate speech recognition result does not match the context data. In this case, EOS timeout may be extended by a predetermined amount of time to allow additional time for the input of audio of the file name to be opened. Thus, rather than a partial transcription of the utterance and, for example, an indication to the user that there is no file named "open", which is an undesirable user experience, a transcription of the full utterance "open file A" may be generated. Alternatively, in response to determining no match between an intermediate speech recognition result and context data, EOS timeout may revert to a default period of time as a default EOS timeout.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include a special purpose logic circuitry, e.g., a field programmable gate array (FPGA) or an application specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network, e.g., the Internet, and peer-to-peer networks, e.g., ad hoc peer-to-peer networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, structured files, or the like, may be used.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method that when executed on data processing hardware cause the data processing hardware to perform operations comprising:
    receiving audio data of an utterance spoken by a user, the audio data captured by a client device;
    generating, using an automated speech recognizer (ASR), a first intermediate speech recognition result by performing speech recognition on the audio data of the utterance, the ASR configured to endpoint utterances by terminating performance of speech recognition on received audio data based on detecting non-speech for at least an end of speech (EOS) timeout duration;
    while receiving the audio data of the utterance and before detecting non-speech for at least the EOS timeout duration:
        determining, using the ASR, a confidence level associated with the first intermediate recognition result generated by the ASR, the confidence level corresponding to a confidence of an accuracy of the first intermediate recognition result;
        determining an expected speech recognition result based on context data of the client device;
        based on the confidence level associated with the first intermediate speech recognition result generated by the ASR, determining that the first intermediate speech recognition result partially matches the expected speech recognition result; and
        extending the EOS timeout duration by a predetermined amount of time based on determining that the first intermediate speech recognition result partially matches the expected speech recognition result;
    receiving additional audio data of the utterance spoken by the user;
    generating, using the ASR, a second intermediate speech recognition result by performing speech recognition on the additional audio data of the utterance spoken by the user; and
    while receiving the additional audio data and before detecting non-speech for at least the extended EOS timeout duration:
        determining that the second intermediate speech recognition result matches the expected speech recognition result; and
        based on determining that the second intermediate speech recognition result matches the expected speech recognition result:
            terminating performance of any speech recognition subsequent to generating the second intermediate speech recognition result by truncating any additional audio data received after generating the second intermediate speech recognition result; and
            deactivating a microphone of the client device.

2. The computer-implemented method of claim 1, wherein a duration of the predetermined amount of time is based on an operating state or condition of an application executing on the client device.

3. The computer-implemented method of claim 1, wherein the ASR executes on a server in communication with the client device via a network.

4. The computer-implemented method of claim 1, wherein the ASR executes on the client device.

5. The computer-implemented method of claim 1, wherein the operations further comprise, based on determining that the second intermediate speech recognition result matches the expected speech recognition result, providing, for output, a final speech recognition result generated by ASR.

6. The computer-implemented method of claim 1, wherein the expected speech recognition result is based on context data received from the client device prior to receiving the audio data of the utterance.

7. The computer-implemented method of claim 1, wherein the operations further comprise receiving the context data from the client device contemporaneously with receiving the audio data of the utterance.

8. The computer-implemented method of claim 1, wherein the context data comprises an operating state or condition of an application executing on the client device.

9. A system comprising:
    data processing hardware; and
    memory hardware in communication with the data processing hardware and storing instructions that when executed on the data processing hardware cause the data processing hardware to perform operations comprising:
        receiving audio data of an utterance spoken by a user, the audio data captured by a client device;
        generating, using an automated speech recognizer (ASR), a first intermediate speech recognition result by performing speech recognition on the audio data of the utterance, the ASR configured to endpoint utterances by terminating performance of speech recognition on received audio data based on detecting non-speech for at least an end of speech (EOS) timeout duration;
        while receiving the audio data of the utterance and before detecting non-speech for at least the EOS timeout duration:

determining, using the ASR, a confidence level associated with the first intermediate recognition result generated by the ASR, the confidence level corresponding to a confidence of an accuracy of the first intermediate recognition result;

determining an expected speech recognition result based on context data of the client device;

based on the confidence level associated with the first intermediate speech recognition result generated by the ASR, determining that the first intermediate speech recognition result partially matches the expected speech recognition result; and extending the EOS timeout duration by a predetermined amount of time based on determining that the first intermediate speech recognition result partially matches the expected speech recognition result;

receiving additional audio data of the utterance spoken by the user;

generating, using the ASR, a second intermediate speech recognition result by performing speech recognition on the additional audio data of the utterance spoken by the user; and while receiving the additional audio data and before detecting non-speech for at least the extended EOS timeout duration:

determining that the second intermediate speech recognition result matches the expected speech recognition result; and based on determining that the second intermediate speech recognition result matches the expected speech recognition result:

terminating performance of any speech recognition subsequent to generating the second intermediate speech recognition result by truncating any additional audio data received after generating the second intermediate speech recognition result; and deactivating a microphone of the client device.

10. The system of claim 9, wherein a duration of the predetermined amount of time is based on an operating state or condition of an application executing on the client device.

11. The system of claim 9, wherein the ASR executes on a server in communication with the client device via a network.

12. The system of claim 9, wherein the ASR executes on the client device.

13. The system of claim 9, wherein the operations further comprise, based on determining that the second intermediate speech recognition result matches the expected speech recognition result, providing, for output, a final speech recognition result generated by ASR.

14. The system of claim 9, wherein the expected speech recognition result is based on context data received from the client device prior to receiving the audio data of the utterance.

15. The system of claim 9, wherein the operations further comprise receiving the context data from the client device contemporaneously with receiving the audio data of the utterance.

16. The system of claim 9, wherein the context data comprises an operating state or condition of an application executing on the client device.

* * * * *